L. R. DAVIS & D. F. GATES.
SPADING AND DIGGING PLOW.
APPLICATION FILED MAY 19, 1917.
1,272,231.
Patented July 9, 1918.
2 SHEETS—SHEET 1.
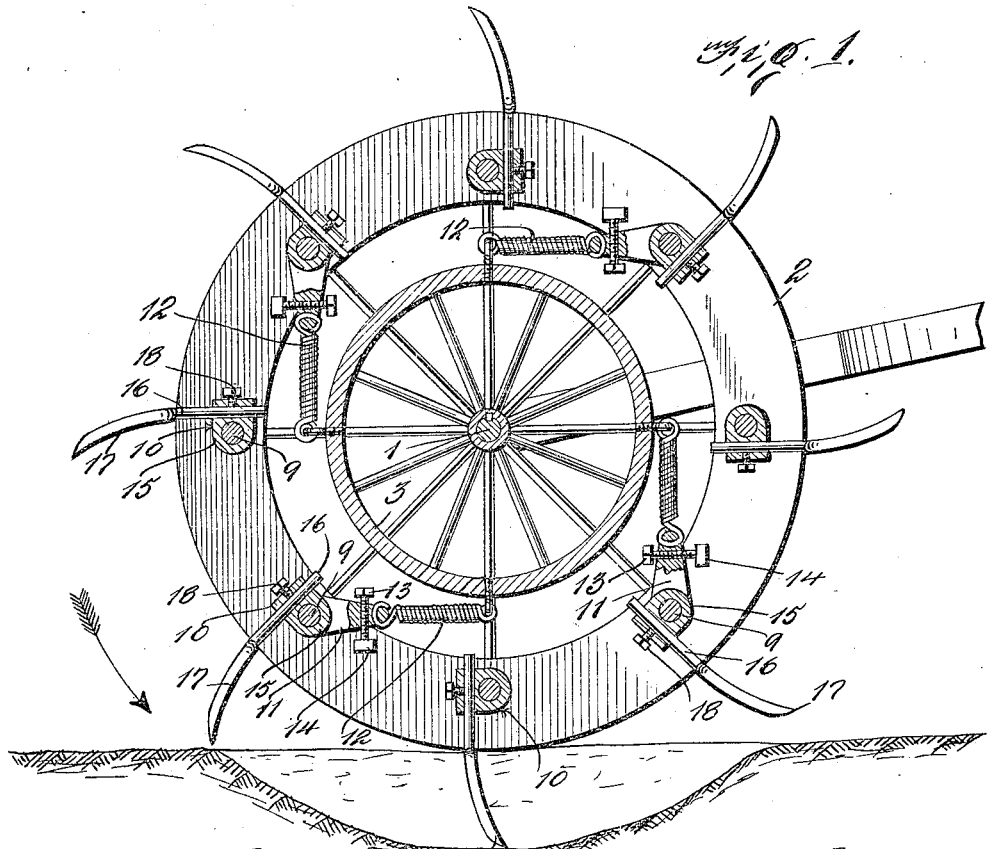
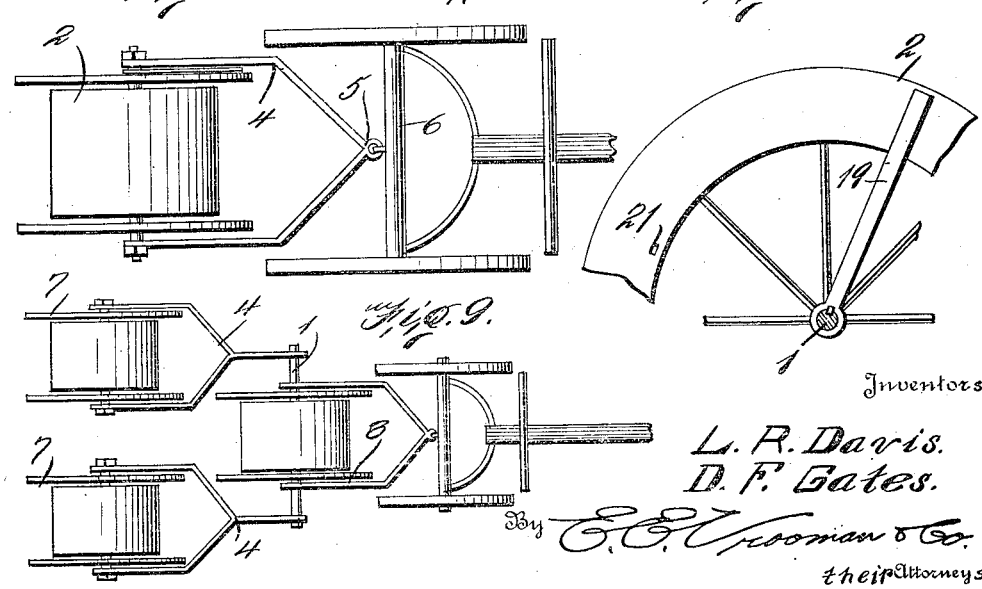
Inventors
L. R. Davis.
D. F. Gates.
By E. E. Vrooman & Co.
their Attorneys

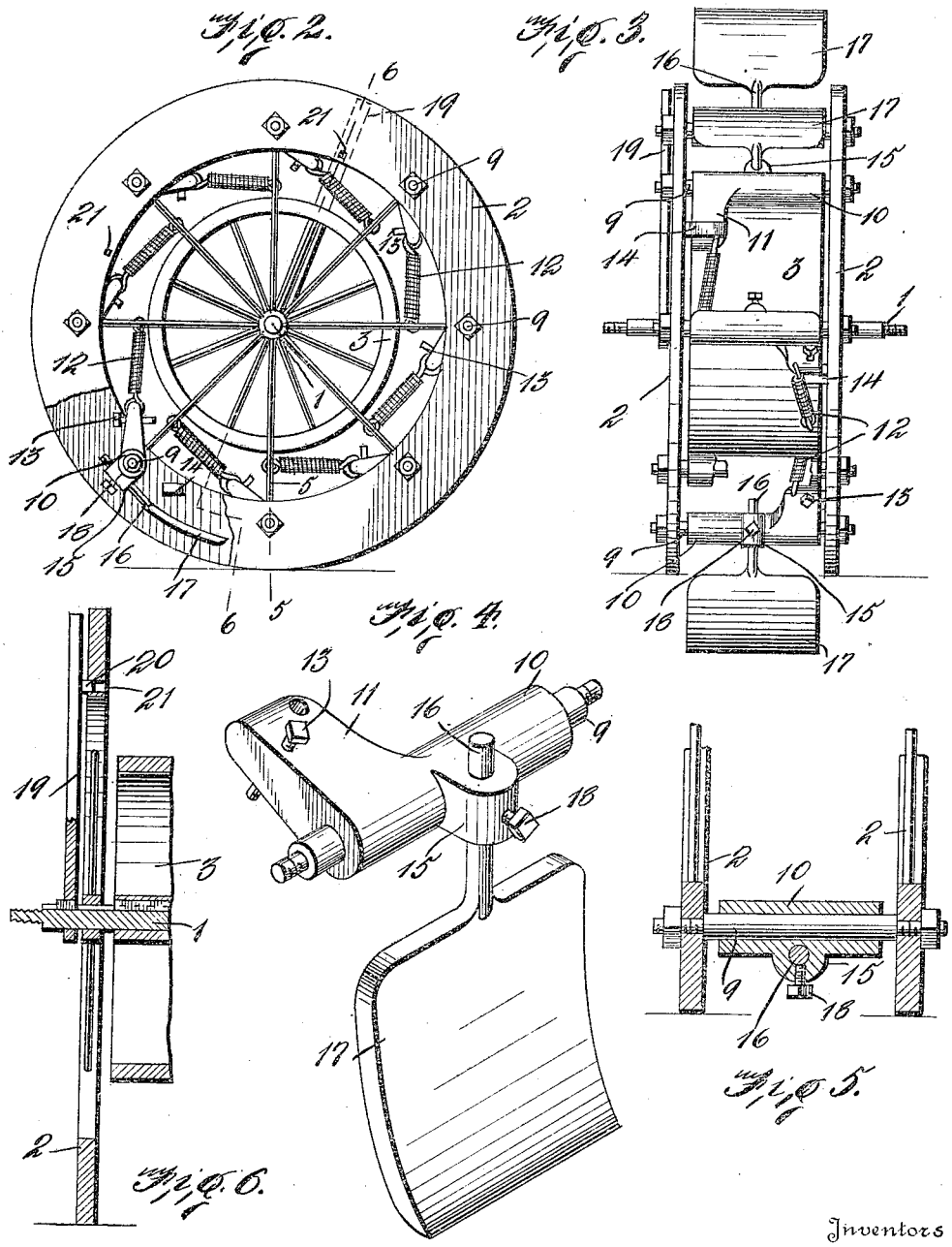

UNITED STATES PATENT OFFICE.

LEMUEL R. DAVIS, OF HOPKINSVILLE, AND DANIEL F. GATES, OF FRUITHILL, KENTUCKY.

SPADING AND DIGGING PLOW.

1,272,231.

Specification of Letters Patent.

Patented July 9, 1918.

Application filed May 19, 1917. Serial No. 169,687.

*To all whom it may concern:*

Be it known that we, LEMUEL R. DAVIS and DANIEL F. GATES, citizens of the United States of America, residing at Hopkinsville and Fruithill, respectively, in the county of Christian and State of Kentucky, have invented certain new and useful Improvements in Spading and Digging Plows, of which the following is a specification, reference being had therein to the accompanying drawing.

This invention relates to spading and digging plows and has for its object the production of a simple and efficient plow which will dig into the ground over which the same is passed in the same manner as a person would use a spade.

Another object of this invention is the production of a simple and efficient means for supporting the spades upon the plow drum.

A still further object of this invention is the production of a simple and efficient means for holding the blades in an adjusted position whereby the plow drum may be conveniently moved from place to place when so desired.

With these and other objects in view, this invention consists of certain novel combinations, constructions, and arrangements of parts as will be hereinafter fully described and claimed.

In the accompanying drawings:—

Figure 1 is a central section through the plow and blade supporting drum.

Fig. 2 is a side elevation of the drum, certain parts being broken away.

Fig. 3 is an end view of the drum.

Fig. 4 is a detailed perspective of one of the spading blades.

Fig. 5 is a section taken on the line 5—5 of Fig. 2.

Fig. 6 is a section taken on the line 6—6 of Fig. 2.

Fig. 7 is a side elevation of a portion of the outer drum showing the manner in which the locking lever is adapted to hold the digging blades in an upwardly extending position.

Fig. 8 is a top plan view of one method of attaching the digging drum by means of a swivel to a truck.

Fig. 9 is a top plan view or diagram of the method of attaching a plurality of these digging drums to a truck.

Referring to the accompanying drawings by numerals it will be seen that 1 designates the central supporting axle, which central supporting axle engages or supports the outer drum 2 which outer drum comprises a pair of side plates as clearly illustrated in Fig. 2 of the drawings. An inner drum 3 is keyed to the shaft 1, as illustrated clearly in Figs. 1 and 2 of the drawings and a yoke frame 4 is connected to the outer ends of the shaft 1 for the purpose of facilitating the conveying of the plow from place to place. The forward end of the yoke frame 4 is connected by means of a swivel joint 5 to the frame of a yoke 6 as illustrated in Fig. 8 when only one of these drums is being used.

When a plurality of these drums are employed, such as for instance when three drums are employed, the rear drums 7 as illustrated in Fig. 9 have their yoke frames 4 engaging the projecting ends of the axle or shaft 1 of the forward drum 8, as illustrated in Fig. 9.

It should of course be understood that any suitable or desired arrangement may be employed without departing from the spirit of the invention, whereby one or more of these digging plows may be connected to a truck.

By carefully considering Fig. 1 it will be seen that the outer drum 2 supports the transversely extending plow blade supporting shafts 9 near the outer periphery thereof. A plow blade supporting sleeve 10 is loosely mounted upon each of these shafts 9 as clearly illustrated and each of these sleeves 10 as illustrated in Fig. 4 is provided with a rearwardly extending lip 11 to which lip 11 is connected a coiled spring 12 which coiled spring 12 is connected at its opposite end to the inner drum 3. The tongue 11 is provided with an adjusting bolt 13 and this adjusting bolt is adapted to be regulated for engaging a lug 14 carried by one of the plates of the drum 2 to limit the swinging movement. Each of these sleeves 10 is provided with a projecting finger 15 through which projecting finger 15 passes the supporting neck 16 of the digging blade 17 of the plow. A bolt 18 extends through the finger 15 and engages the neck 16 for firmly holding the blade 17 in an adjusted position within the finger 15.

A locking lever 19 is keyed to the shaft 1 and is provided with an inwardly projecting lug 20 which lug is adapted to fit in one of the adjusting apertures 21 formed in the outer face of one of the plates of the drum 22. This lever 19 is adapted to engage one of the apertures 21 as above stated whereby the shaft 1 may be held against rotary movement. It will be seen that when the lever 19 engages the aperture 21 as shown in full lines in Fig. 2, the drum 3 will be rotated to such a position as to cause the plow blades 17 to be drawn within the outer periphery of the plates of the outer drum 2 and thereby permit the outer drum to be easily and readily conveyed from place to place without any danger of having the blade 17 dig into the ground over which the device is passing.

When, however, the lever 19 engages the other aperture 21 which is placed at right angles to the first aperture 21 or as shown in full lines in Fig. 7, the drum 3 will be so rotated as to pull the springs 12 forward so as to extend at right angles to the position shown in Fig. 2 or in other words in the position shown in Fig. 1, thereby causing the blades 17 to project outwardly such as is shown in Fig. 1 of the drawings. It should be understood that the lugs 14 will constitute a means for limiting the rearward movement of the blades 17 as these bolts 13 will prevent the further swinging movement of the plow blades 17 when said bolts engage the lugs 14 carried by one of the plates of the drum 2.

It should be understood that the tongues 11 are so placed upon the sleeves 10 as to have the tongue 11 of every alternate sleeve 10 to be placed upon the opposite end of the sleeve 10 as clearly illustrated in Fig. 3 of the drawings thereby permitting an even pull to take place upon the respective digging blades 17.

From the foregoing description it will be seen that a very simple and efficient device has been produced for digging a ditch in the same manner as a person would use a spade, and by means of the construction above described and clearly illustrated, the dirt may be thrown from the digger blades so as to efficiently loosen the earth which is being engaged by the digger blades, as a direct forward scooping action will take place.

It should be understood that when the blades 17 are thrown to the position shown in Fig. 1, and also in view of the fact that the blades are pivotally supported upon the drum 2 and yieldably connected to the drum 3, a very simple and efficient means has been produced for causing the blades to readily and efficiently dig into the earth which is to be dug or plowed.

What we claim is:—

1. A plow of the class described comprising an outer drum, an inner drum, a supporting shaft, said inner drum keyed to said supporting shaft, an operating lever secured to said supporting shaft, blades carried by said outer drum, means for yieldably connecting said blades to said inner drum, and means carried by said lever for engaging said outer drum for rotating and locking said inner drum in an adjusted position with respect to said outer drum and changing the position of said digging blades.

2. A device of the class described comprising an outer drum, a plurality of stop lugs carried by said outer drum, an inner drum, a supporting shaft keyed to said inner drum, said outer drum being loosely mounted upon said supporting shaft, a plurality of blade supporting shafts carried by said outer drum, plow blades carried by said blade supporting shafts and adapted to swing thereon, springs secured to said inner drum, a sleeve formed upon each plow blade, said sleeve provided with an inwardly extending lip, and said springs being secured at their outer ends to the lips of said sleeves and means carried by said lips and adapted to be thrown into engagement with said stop lugs carried by said outer drum for limiting the forward swinging movement of said lips, and means for rotating said inner drum with respect to said outer drum.

3. A plow of the class described comprising an outer drum, an inner drum, a shaft keyed to said inner drum, said outer drum being loosely mounted upon said shaft, a plurality of plow blades supporting shafts carried by said outer drum, a sleeve rotatably mounted upon each shaft, a plow blade adjustably mounted upon each sleeve, yieldable means coöperating with said sleeve for normally holding said plow blades extended at right angles with the periphery of said outer drums, and means carried by said outer drum for holding said plow blades against swinging movement in one direction beyond a predetermined degree.

4. A plow of the class described comprising an outer drum, an inner drum, a shaft keyed to said inner drum, said outer drum being loosely mounted upon said shaft, a plow blade supporting shaft supported by said outer drum, a plow blade carried by said plow blade supporting shaft, a sleeve for supporting said plow blade, an inwardly extending lip carried by said sleeve, means for yieldably connecting said lip to said inner drum and normally holding said plow blade at approximately right angles to the periphery of said outer drum, a plurality of stop lugs carried by said outer drum, and adjustable screws carried by said lip and adapted to engage one of said stop lugs for limiting the swinging movement of said lip in one direction beyond a predetermined degree.

In testimony whereof we hereunto affix our signatures.

LEMUEL R. DAVIS.
DANIEL F. GATES.

Copies of this patent may be obtained for five cents each, by addressing the "Commissioner of Patents, Washington, D. C."